Dec. 2, 1924.
L. NAGY, SR
TRACTION SHOE
Filed July 21, 1924
1,517,450
2 Sheets-Sheet 1
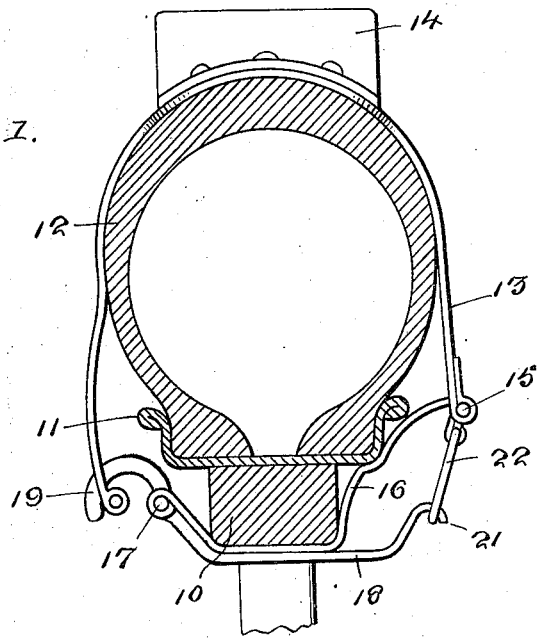
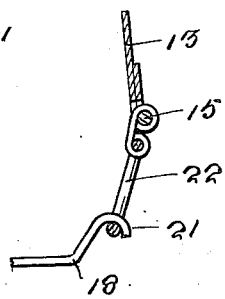
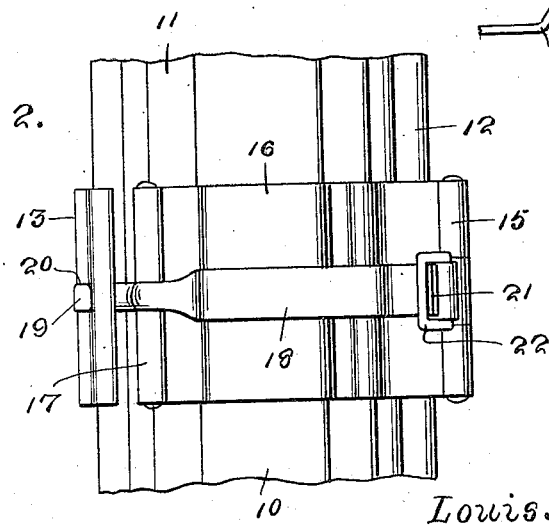
Louis Nagy, Sr.
INVENTOR
BY Victor J. Evans
ATTORNEY
WITNESS:
E. R. Ruppert Dec. 2, 1924.  L. NAGY, SR  1,517,450
TRACTION SHOE
Filed July 21, 1924  2 Sheets-Sheet 2
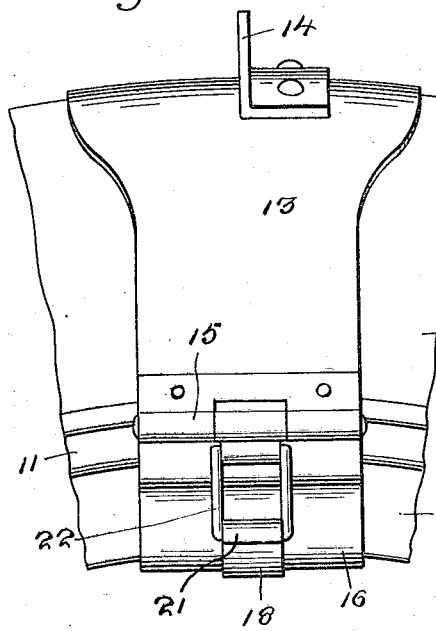
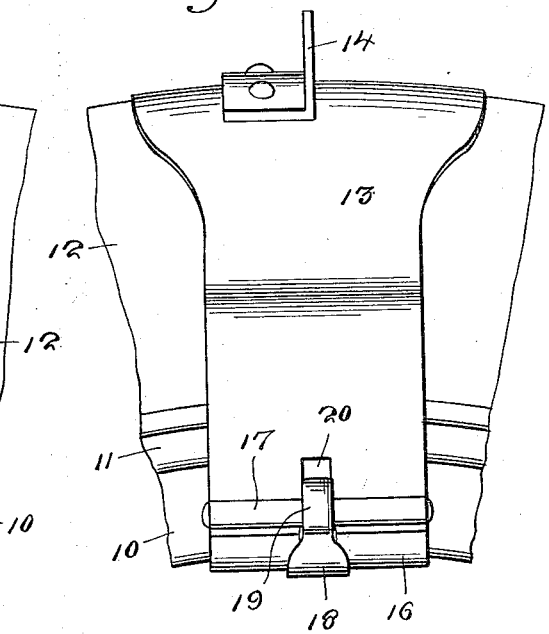
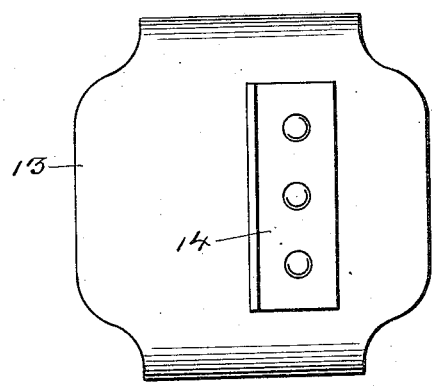

Patented Dec. 2, 1924.

1,517,450

UNITED STATES PATENT OFFICE.

LOUIS NAGY, SR., OF WILLIS, MICHIGAN.

TRACTION SHOE.

Application filed July 21, 1924. Serial No. 727,368.

*To all whom it may concern:*

Be it known that I, LOUIS NAGY, Sr., a citizen of the Republic of Hungary, residing at Willis, in the county of Washtenaw and State of Michigan, have invented new and useful Improvements in Traction Shoes, of which the following is a specification.

This invention relates to traction shoes for vehicle wheels and has for an object the provision of a shoe for this purpose which may be readily applied and removed and which will be securely held in position for use.

Another object of the invention is the provision of a traction shoe of this character which is simple in construction and which will provide ample and effective traction in mud, sand, snow and the like and which may be removed for travel over good roads without jacking up the vehicle.

With the above and other objects in view, the invention further includes the following novel features and details of construction, to be hereinafter more fully described, illustrated in the accompanying drawings and pointed out in the appended claims.

In the drawings:—

Figure 1 is a transverse sectional view through a portion of a vehicle wheel and tire with the invention applied.

Figure 2 is a fragmentary inner plan view of the same.

Figure 3 is a fragmentary side elevation.

Figure 4 is a similar view looking at the opposite side from that shown in Figure 3.

Figure 5 is a detail plan view of the shoe.

Figure 6 is a fragmentary section illustrating the engagement of the locking lever.

Referring to the drawings in detail wherein like characters of reference denote corresponding parts, the reference character 10 indicates the felly of a vehicle wheel, 11 the rim and 12 the tire.

The invention which is adapted to be secured transversely of the tire comprises a traction plate carrier which includes a substantially U-shaped body section 13 to which the traction plate 14 is secured. This traction plate may be of any suitable character and is shown as substantially L-shaped, being secured transversely of the tire by means of rivets or other suitable fastening means.

Hingedly secured to one end of the U-shaped body section 13 as shown at 15, is a hinged section 16 which forms a part of the carrier and which extends transversely across and is shaped to engage the felly 10 and the rim 11. Pivotally secured to one end of the hinged section 16 as shown at 17, is a resilient locking lever 18. This lever is provided at one end with a hook 19 which is adapted to enter and engage the edge of a slot 20 provided in the U-shaped section 13. The opposite end of the lever 18 is provided with an offset hook 21 which is adapted to engage a link 22 which is pivotally connected to the end of the U-shaped section 13 adjacent the pivot 15.

The device may thus be placed around a tire and the hook 19 engaged in the slot 20, the locking lever being forced inward so that its hook end 21 will engage the link 22. The device will thus be secured in place in a manner to permit of the tire 12 being depressed in its travel over the road, without having the carrier become loose, the resilient end of the lever 18 which locks the carrier in place compensating for the resiliency of the tire 12.

The invention is susceptible of various changes in its form, proportions and minor details of construction and the right is herein reserved to make such changes as properly fall within the scope of the appended claims.

Having described the invention what is claimed is:—

1. In a traction shoe for vehicles, a carrier adapted to be positioned around the tire and felly of a wheel and comprising a substantially U-shaped tire engaging body section, a felly engaging section having one end hingedly secured to one end of the body section, a locking lever pivotally secured to the hinged felly engaging section, a detachable connection between the lever and the first mentioned end of said body section and a traction member carried by the body section.

2. In a traction shoe for vehicles, a carrier adapted to be positioned around the tire and felly of a wheel and comprising a substantially U-shaped tire engaging body section, a traction member carried thereby, a felly engaging section having one end hingedly secured to one end of the body section, a locking lever pivotally secured to the pivotally hinged felly section, a hook at one end of the lever for engagement with the opposite end of the body section and means for detachably connecting the opposite end of said lever to the first mentioned end of the body section.

3. In a traction shoe for vehicles, a carrier adapted to be positioned around the tire and felly of a wheel and comprising a substantially U-shaped tire engaging body section, a traction member carried thereby, a felly engaging section having one end hingedly secured to one end of the body section, a resilient locking lever pivotally secured to the hinged section, a hook at one end of the lever for engagement with the opposite end of the body section and means for detachably connecting the opposite end of said lever to the first mentioned end of the body section.

4. In a traction shoe for vehicles, a carrier adapted to be positioned around the tire and felly of a wheel and comprising a substantially U-shaped tire engaging body section, a felly section extending transversely across and engaging the felly and rim, a resilient locking lever pivotally secured to one end of the felly engaging section, a hook at one end of the lever for detachable connection with the opposite end of the body section, a link pivotally secured to the first mentioned end of said body section and an offset hook carried by the locking lever for engagement with said link.

5. In a traction shoe for vehicles, a carrier adapted to be positioned around the tire and felly of a wheel and comprising a substantially U-shaped tire engaging body section, a traction member carried thereby, a felly engaging section having one end hingedly secured to one end of the body section, a double hooked locking lever carried by the hinged felly engaging section and means at the opposite ends of the body section for detachable engagement with the hooks of the locking lever.

In testimony whereof I affix my signature.

LOUIS NAGY, Sr.